Feb. 4, 1936. A. O. BUCKIUS 2,029,982
CAR TRUCK SIDE FRAME AND BOLSTER CONSTRUCTION
Filed Oct. 27, 1931  4 Sheets-Sheet 1
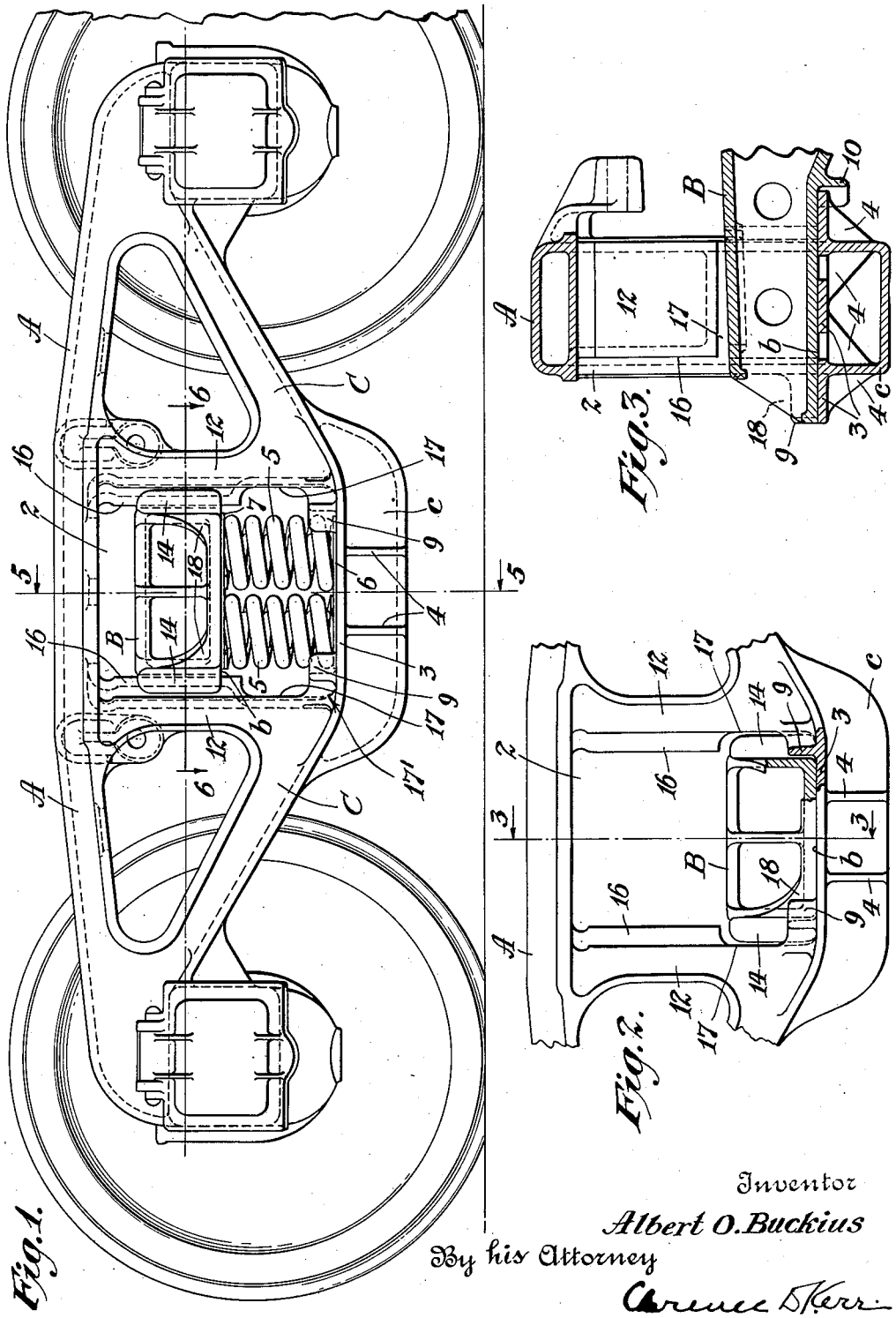
Inventor
Albert O. Buckius
By his Attorney
Clarence D. Kerr

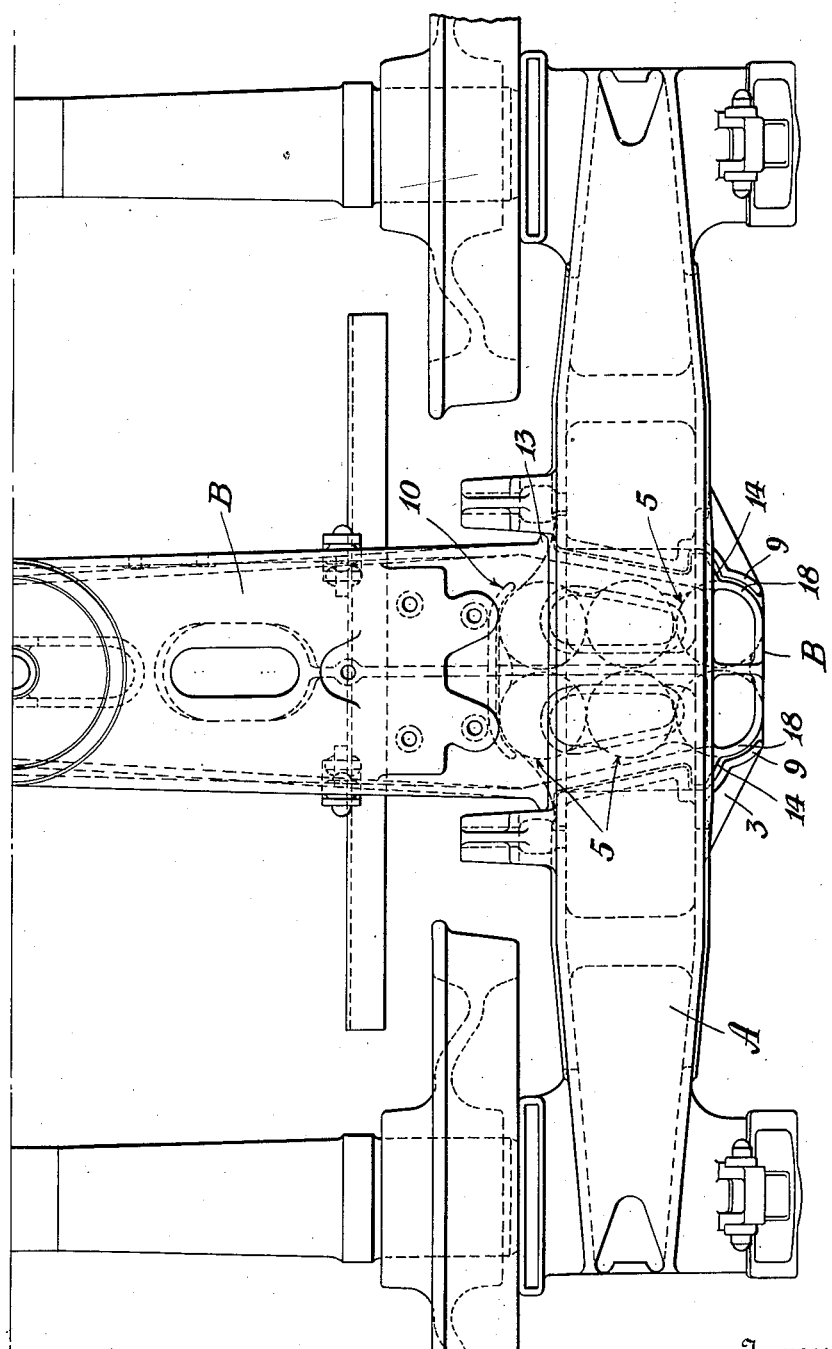

Feb. 4, 1936.  A. O. BUCKIUS  2,029,982
CAR TRUCK SIDE FRAME AND BOLSTER CONSTRUCTION
Filed Oct. 27, 1931  4 Sheets-Sheet 3
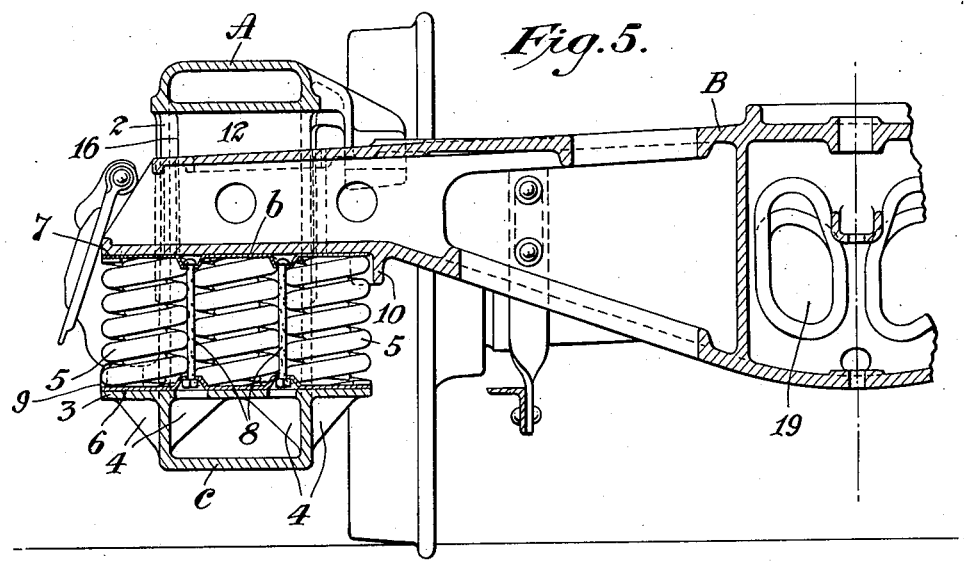
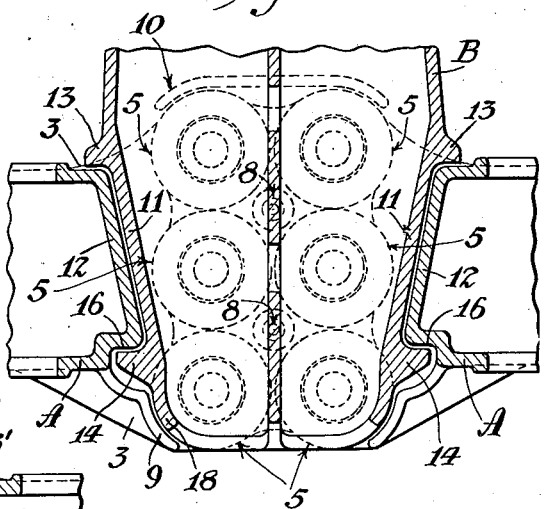
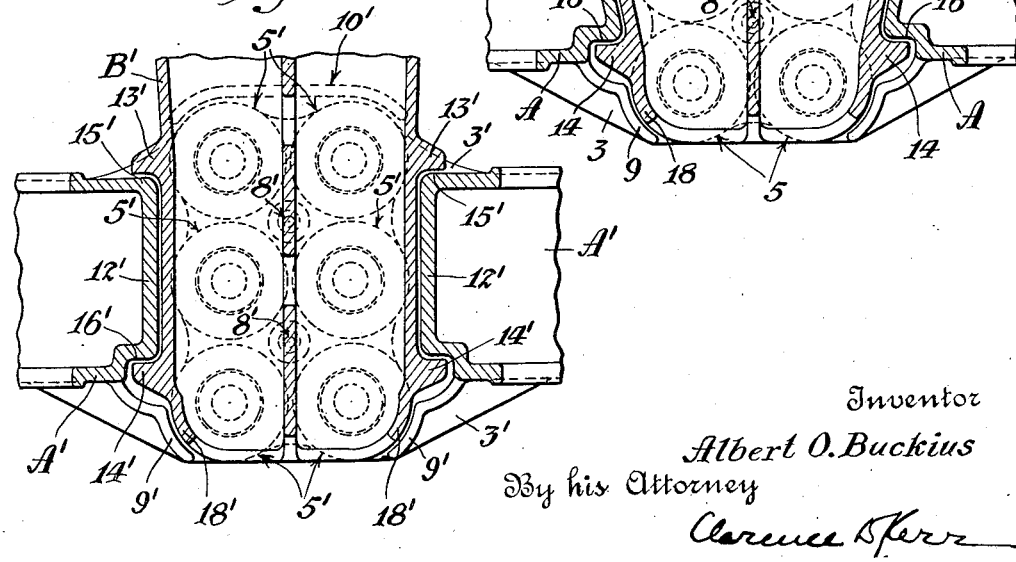
Inventor
Albert O. Buckius
By his Attorney

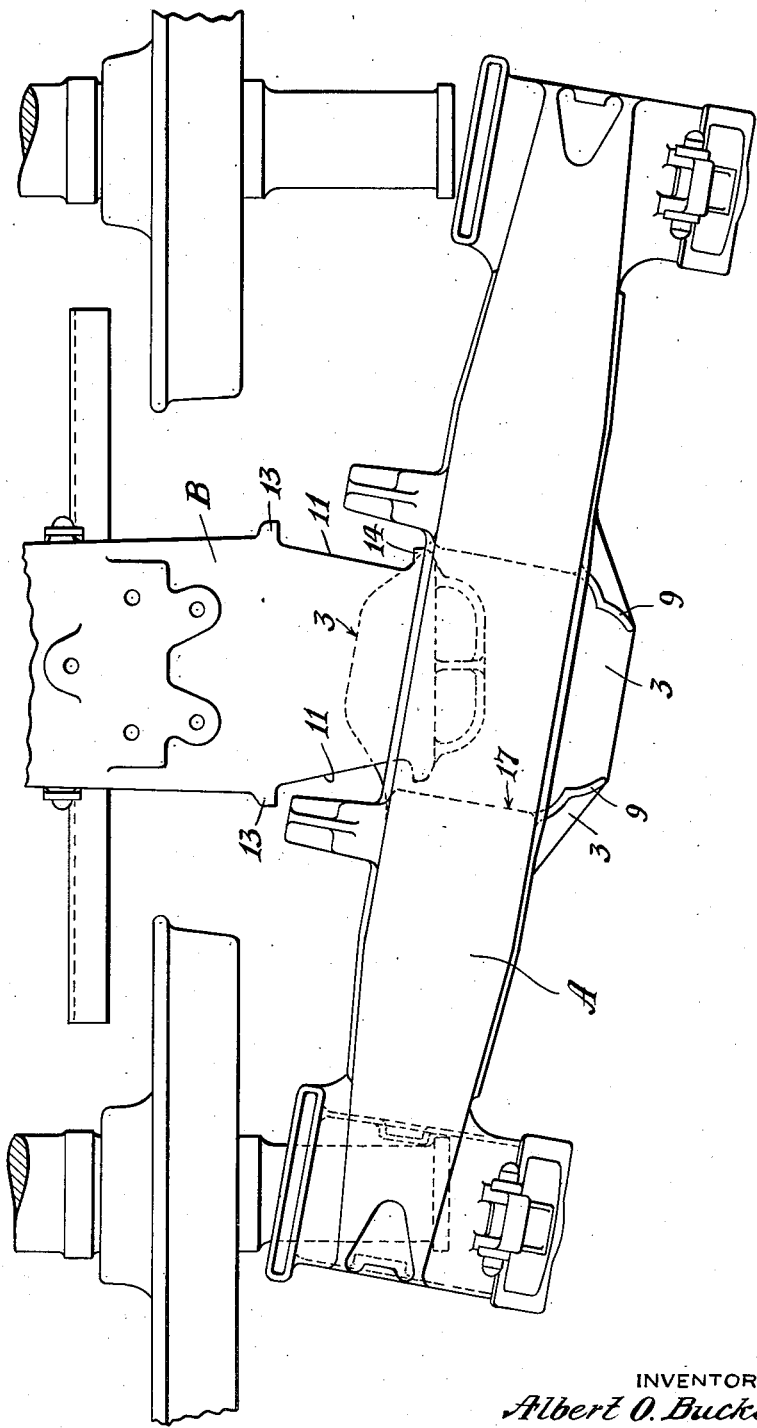

Patented Feb. 4, 1936

2,029,982

UNITED STATES PATENT OFFICE 2,029,982

CAR TRUCK SIDE FRAME AND BOLSTER CONSTRUCTION

Albert O. Buckius, Cleveland, Ohio, assignor to National Malleable and Steel Castings Company, Cleveland, Ohio, a corporation of Ohio Application October 27, 1931, Serial No. 571,295

14 Claims. (Cl. 105—197)

This invention is concerned with railway car trucks, and more particularly with improved constructions whereby the truck bolster and the side frame members are interrelated. An object of the invention is to provide such a construction including simple and effective means for preventing displacement of springs between the bolster and frame members. Another object is to provide for resting the bolster ends on the side frames when desired as in assembling and disassembling the truck, without damage to any part of the construction. A further object is to devise such a truck having increased spring capacity. Other objects are to provide a construction of this character in which the necessity of a spring plank is eliminated, and which is simple and inexpensive to manufacture and easy to assemble and disassemble. Other objects and advantages will become apparent as the description proceeds.

In order to illustrate a preferred form of my invention, reference will now be had to the accompanying drawings wherein: Fig. 1 is a side elevation of a car truck in accordance with the invention. Fig. 2 is a side elevation, partly broken away, showing the springs removed and the end of the bolster resting on the side frame. Fig. 3 is a section on the line 3—3 of Fig. 2. Fig. 4 is a plan view of one side of the truck shown in Fig. 1. Figs. 5 and 6 are sections partly broken away, taken on the lines 5—5 and 6—6, respectively, of Fig. 1. Fig. 7 shows a modification of the construction in Figs. 1–6. Fig. 8 illustrates a stage in the preferred method of removing an axle.

There is shown at A one form of car truck side frame, partly of known construction, including tension members C. Columns 12 extend between these tension members and the upper part of the side frame and form a window 2 for receiving the bolster B. Connecting the tension members is tension member c which may be box-shaped as shown in Fig. 3, the top of the box being shown extended laterally at the inner and outer sides of the frame and constituting a shelf 3 which joins the lower ends of the columns. Vertical webs 4, in the nature of brackets, formed on the frame, are desirably provided to brace the shelf, which is the support for the bolster supporting springs 5. The shelf is preferably below the level of the axles, giving increased stability.

In the construction described there is provision for two rows of coil springs, each of three sets, in parallel and arranged transversely of the frame, the springs in one row being shown as side by side with those in the other row. This is advantageously accomplished in part by the shelf construction which provides for the desired transverse extent of the springs. The springs may be of the usual type, though standard A. R. A. (American Railway Association) class G springs may be employed in order to increase the spring capacity of the truck. This feature is broadly disclosed in the copending application of James A. Shafer, Ser. No. 319,500, filed November 15, 1928, and hence need not be discussed here in detail. Also, it may be pointed out that in this construction, not only is provision made in a simple manner for increased spring capacity, but excess rolling of the side frames is arrested by reason of the large lateral or transverse extent of the engagement between the bolster and springs.

The springs 5 conveniently rest on spring plate 6 which seats on the shelf 3, while a similar plate 7 extends across the top of the springs, the two plates being shown connected by bolts or pins 8. The bottom of the end of the bolster is shown formed as a flat surface b which rests directly on the upper spring plate and is of substantially the same area thereas. In order to prevent displacement of the springs, there are provided upwardly extending flanges 9 which are preferably formed on the shelf 3 at the outer side of the frame and shaped to the contour of the springs. The extent of the flanges may vary considerably, but they preferably adjoin the tension members and lie partly at the outer side of the outermost springs as well as between these springs and the ends of the side frames, so as to prevent both transverse and longitudinal displacement of the springs. For similar purposes a downwardly extending flange 10 is shown formed on the bolster adjacent the sides of the inner springs.

As best appears in Fig. 6, the bolster and side frames are constructed so that the bolster ties together the latter. In this preferred form the walls of the bolster are shown tapered as at 11, the wider being nearer the center of the bolster, while the columns 12 are similarly inclined at their upper portions between which the tapered portion of bolster is normally located when the truck is assembled with the springs in place. On the bolster are formed projections or lugs 13 and 14 for engaging the inner faces of the columns and the shoulders 16 at the outer sides of the columns, respectively, to prevent excessive transverse movement of the bolster in either direction with respect to the side frame. As shown in Figure 6 the clearance between the bolster walls 11 and the columns 12 is at least as great as the clearance between the lugs 13, 14 and the side frame. It will be appreciated that the shoulders 16 are not essential, as the lugs could engage the corners of columns formed without such shoulders, but for convenience in manufacture and for maintaining dimensions within desired limits, it is desirable to form the shoulders as shown.

In the form of my invention shown in Fig. 7, the sides of the bolster and cooperating side frame columns are shown parallel instead of tapered. Aside from this, the features in Fig. 7 are the same as those present in Figs. 1-6, and the elements in Fig. 7 corresponding to those in the other views are designated by the same reference numerals primed.

In order to permit the assembly of the parts, the lower portions of the columns adjacent the shelf are cut away as shown at 17, so that the lugs 14 will clear the columns when the side frame window is passed over the end of the bolster. In other words, the bottoms of the windows are wider than their upper portions. This step in the assembly is, of course, accomplished before the springs are put in place. The side frame may then be lowered with the lugs properly aligned, or the bolster raised, the trucks being thus simply assembled. It only remains to insert the springs, while the bolster is jacked up, after which the latter is seated, in the position shown in Fig. 1.

To permit the entire flat surface b of the bolster to rest securely on the shelf, its outer end is desirably formed as at 18 so that it will lie within the flanges 9 when in lowered position as shown in Fig. 2. It may advantageously conform to the shape of these flanges. The flange 10 on the bolster is formed so that it lies outside the shelf and does not interfere therewith when the bolster is lowered, as shown in Fig. 3.

By forming the bolster, with a flat surface b and the shelf with a flat surface, both adapted to cooperate with and act as seats for the springs, as well as to lie flush when the springs are removed and the bolster is lowered, as during assembly, the need for the usual spring centering lugs is avoided, and the cut-away portions 17 of the columns can thus be made shorter than would otherwise be necessary for assembly purposes and can begin at points 17' at the intersections of the columns with the tension member, or in other words, at the shelf. In this manner maximum strength of the side frame is attained.

The tapered bolster, as shown in Fig. 6, is highly advantageous in that it provides for ease of assembly and disassembly of the truck, especially when combined with the features just described which permit the bolster to be rested on the side frame. For instance, it is often desired to remove one pair of wheels without completely removing the heavy side frames, and this may be accomplished with the construction illustrated by jacking up the bolster, removing the springs, and then lowering the bolster till it rests on the side frames. The side-frames may then be raised and blocked up, whereupon, after removing the conventional journal brasses and wedges, the side frames by reason of the tapered construction of the bolster, may be swung out off the ends of the axle, as shown in Fig. 8 and the axle and wheels removed. Of course, in this operation the bolster need not strictly rest upon the side frames, but may be blocked up so as to leave some clearance between it and the side frames, while at the same time permitting its ends to pass through the openings in the columns.

The bolster is shown as provided with openings 19 for receiving brake rods, though this feature, as well as certain others described, are not claimed herein because claimed in certain copending applications.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a car truck, a side frame having a bolster receiving window opening and a shelf at the bottom of the window, a bolster having a spring retaining flange at its under side and outside the limits of the shelf, and having a flat spring seating portion extending from the flange to the end of the bolster, springs operatively interposed between the shelf and flat portion, and means whereby the bolster ties the side frames together, said flat portion of the bolster being adapted to rest on said shelf when said springs are removed.

2. In a car truck, a side frame having a window opening therein, a shelf portion formed at the bottom of the window and extending transversely beyond the frame proper, springs on the shelf, and a bolster having a flat portion adapted to be supported when the truck is assembled by the springs and to rest on the shelf during assembly and disassembly of the truck, one of said portions being provided with a spring retaining flange adapted to lie clear of the other of said portions when the bolster is on the shelf.

3. In a car truck including a bolster with a substantial flat spring seating portion, springs and side frame members having windows formed therein bounded by columns and a shelf, said windows being wider at the bottom than at the top, portions formed on the bolster for engaging the columns at their upper portions and for entering the bottom of the window, and portions carried by the bolster and shelf and adapted to prevent displacement of said springs, said last named portions being so positioned as to enable said spring seating portion to engage the shelf when the bolster is in lowermost position and said springs are removed.

4. In a car truck including a bolster, springs and side frame members having windows formed therein bounded by columns and a shelf, said windows being wider at the bottom than at the top, tapered portions at the ends of the bolster, and portions on said tapered portions for engaging the columns at their upper portions and for entering the bottom of the window.

5. In a car truck including a bolster, springs and side frame members having windows formed therein bounded by columns and a shelf, said windows being wider at the bottom than at the top, tapered portions at the ends of the bolster, portions on said tapered portions for engaging the columns at their upper portions at inner and outer sides of the frame and for entering the bottom of the window, a flat portion on the bolster adapted to seat on the shelf when said springs are removed, and flanges formed on the bolster and shelf, outside of said flat portion, for preventing displacement of the springs, whereby said flat portion may rest on said shelf while one end of said side frame is swung outwardly.

6. In a car truck including a bolster, springs and a pair of side frames each having a window and a shelf therebelow, a flat portion formed on the bolster and adapted to rest on the springs and provided with means integral with said flat portion for tieing the side frames when the springs are on the shelves, said flat portion being adapted to rest on the shelves when the springs have been removed, said window and the ends of the bolster being constructed and arranged to provide for swinging either end of either side frame outwardly while the bolster rests on the shelf.

7. In a car truck including a bolster, springs and a side frame having a window and a shelf therebelow, a flat portion formed on the bolster and adapted to rest on the springs for tieing the side frames when the springs are on the shelf, and to rest on the shelf when the springs have been removed, and flanges on the bolster and shelf for preventing displacement of the springs, each of said flanges lying outside said flat portion and the opposite portion on the shelf.

8. In a car truck, a pair of side frames each comprising a tension member, a compression member and columns, a bolster joining said side frames, said tension members being widened at their mid-points to form spring seating portions, springs on said seating portions arranged to support the bolster, a flange on each seating portion adjacent one of said springs and adapted to position the latter, said bolster having a substantially flat spring seating portion at each end adapted to engage said springs when the bolster is in elevated position, said bolster spring seating portions terminating short of said side frame flanges so as to enable the spring seating portions of the side frames and bolster to engage each other during assembly and disassembly of the truck.

9. In a car truck, a pair of side frames each comprising a tension member, a compression member, and columns, a bolster joining said side frames, widened spring seating portions being formed at the mid-points of the tension members, springs on said seating portions arranged to support the bolster, flanges formed on the bolster and spaced from the opposite ends thereof for positioning said springs, said bolster having a substantially flat spring seating portion at either end beyond said flanges to engage said springs when the bolster is in elevated position, said bolster spring seating portions being adapted to seat on the spring seating portions formed on the tension members when the springs are removed, during assembly and disassembly of the truck.

10. In a car truck including a bolster, springs and side frame members having windows formed therein, means integral with the bolster and extending laterally therefrom whereby said bolster ties said side frames together in one position of the bolster, said bolster and side frame being constructed and arranged to permit a side frame to be swung outwardly at one end thereof when the bolster is in another position.

11. In a car truck including a bolster, springs and side frame members having windows formed therein, means integral with the bolster whereby said bolster ties said side frames together in one position of the bolster, said bolster comprising a tapered end portion and said window being shaped to enable a side frame to be swung outwardly at one end thereof when the bolster is in another position.

12. In a car truck including a bolster, springs and side frame members having windows formed therein, said bolster having tapered end portions carrying integral projections extending laterally therefrom for tying the side frames together in one position of the bolster, said tapered end portions and the shape of the side frame window being adapted to enable the side frames to be swung outwardly at one end thereof when the bolster is in another position.

13. In a car truck including a bolster, springs, and side frame members having windows therein, inner and outer stop lugs integral with the ends of said bolster adapted to cooperate with the sides of said windows to limit lateral movement of said bolster, the side walls of each bolster end portion in the corresponding side frame window being farther apart at points nearer the center of the bolster than at the outer end of said bolster.

14. In a car truck including a bolster, springs, and side frame members having windows therein, inner and outer stop lugs integral with the ends of said bolster adapted to cooperate with the sides of said windows to limit lateral movement of said bolster, the side walls of each bolster end and the corresponding side frame window comprising portions converging over at least a portion of the distance between the inner and outer portions of said side frame.

ALBERT O. BUCKIUS.